US012064888B2

(12) United States Patent
Son et al.

(10) Patent No.: US 12,064,888 B2
(45) Date of Patent: Aug. 20, 2024

(54) RAZOR CARTRIDGE

(71) Applicant: DORCO CO., LTD., Seoul (KR)

(72) Inventors: Sung Hee Son, Seoul (KR); Se Min Park, Seoul (KR)

(73) Assignee: Dorco Co., Ltd., Seoul (KR)

( * ) Notice: Subject to any disclaimer, the term of this patent is extended or adjusted under 35 U.S.C. 154(b) by 0 days.

(21) Appl. No.: 17/112,944

(22) Filed: Dec. 4, 2020

(65) Prior Publication Data

US 2021/0170615 A1 Jun. 10, 2021

(30) Foreign Application Priority Data

Dec. 10, 2019 (KR) ........................ 10-2019-0164111

(51) Int. Cl.
*B26B 21/40* (2006.01)
*B26B 21/22* (2006.01)

(52) U.S. Cl.
CPC .......... *B26B 21/4031* (2013.01); *B26B 21/22* (2013.01); *B26B 21/4018* (2013.01)

(58) Field of Classification Search
CPC ......... B26B 21/10; B26B 21/14; B26B 21/16; B26B 21/22; B26B 21/222; B26B 21/227; B26B 21/40; B26B 21/4012
USPC ........................................................ 30/47–51
See application file for complete search history.

(56) References Cited

U.S. PATENT DOCUMENTS 5,687,485 A 11/1997 Shurtleff et al.
5,761,814 A 6/1998 Anderson et al.
5,956,848 A 9/1999 Tseng et al.
5,956,851 A 9/1999 Apprille et al.
6,041,926 A 3/2000 Petricca et al.
6,052,903 A 4/2000 Metcalf et al.
6,185,822 B1 2/2001 Tseng et al.
6,212,777 B1 4/2001 Gilder et al.
6,442,839 B1 9/2002 Tseng et al.
(Continued)

FOREIGN PATENT DOCUMENTS

EP 2823941 1/2015
EP 3072647 9/2016
(Continued)

OTHER PUBLICATIONS

European Patent Office Application Serial No. 20213042.3, Search Report dated Apr. 28, 2021, 8 pages.
(Continued)

*Primary Examiner* — Jason Daniel Prone
(74) *Attorney, Agent, or Firm* — Knobbe, Martens, Olson & Bear, LLP

(57) ABSTRACT

According to one embodiment, a razor cartridge includes a shaving blade including a base portion and an edge portion with a cutting edge, and a blade housing including a blade mounting system to accommodate the shaving blade in a longitudinal axis corresponding to a width direction of the blade housing. The blade mounting system includes: multiple mounting bases disposed to be spaced apart from each other along the longitudinal axis; and a plurality of mounting protrusions, at least one of the mounting protrusions protruding from a corresponding one of the multiple mounting bases. The base portion of the shaving blade is supported by mounting protrusions protruding from different ones of the multiple mounting bases.

11 Claims, 6 Drawing Sheets

10

(56) References Cited

U.S. PATENT DOCUMENTS

| | | | | |
|---|---|---|---|---|
| 6,516,518 | B1 | 2/2003 | Garraway et al. | |
| 6,612,040 | B2 | 9/2003 | Gilder | |
| 6,684,513 | B1 | 2/2004 | Clipstone et al. | |
| 7,100,284 | B2 * | 9/2006 | King | B26B 21/225 30/49 |
| 9,308,657 | B2 * | 4/2016 | Bruno | B26B 21/4012 |
| 9,604,373 | B2 * | 3/2017 | Park | B26B 21/4012 |
| 10,369,711 | B2 * | 8/2019 | Washington | B26B 21/4012 |
| 10,391,652 | B2 * | 8/2019 | Bruno | B26B 21/4012 |
| 10,421,204 | B2 * | 9/2019 | Griffin | B26B 21/4012 |
| 10,780,595 | B2 * | 9/2020 | Lin | B26B 21/22 |
| 10,919,166 | B2 * | 2/2021 | Ntavos | B26B 21/4012 |
| 10,960,559 | B2 * | 3/2021 | Kim | B26B 21/4031 |
| 11,059,193 | B2 * | 7/2021 | Bozikis | B26B 21/22 |
| 11,110,620 | B2 * | 9/2021 | Park | B26B 21/222 |
| 11,285,629 | B2 * | 3/2022 | Washington | B26B 21/4012 |
| 2009/0113716 | A1 | 5/2009 | Wain et al. | |
| 2009/0193659 | A1 * | 8/2009 | Park | B26B 21/4012 30/50 |
| 2010/0139103 | A1 | 6/2010 | Miyazaki | |
| 2011/0232101 | A1 * | 9/2011 | Park | B26B 21/4012 30/50 |
| 2011/0289779 | A1 * | 12/2011 | Volodin | B26B 21/227 30/50 |
| 2013/0205595 | A1 | 8/2013 | Bykowski et al. | |
| 2014/0000114 | A1 * | 1/2014 | Wester | B26B 21/4012 30/32 |
| 2015/0090085 | A1 | 4/2015 | Griffin et al. | |
| 2016/0279815 | A1 * | 9/2016 | Washington | B26B 21/4012 |
| 2016/0279816 | A1 * | 9/2016 | Bruno | B26B 21/222 |
| 2019/0202076 | A1 | 7/2019 | Park et al. | |
| 2019/0329434 | A1 * | 10/2019 | Nicholas | B26B 21/4012 |
| 2019/0351568 | A1 | 11/2019 | Kim et al. | |
| 2019/0366572 | A1 * | 12/2019 | Griffin | B26B 21/4012 |
| 2021/0031389 | A1 * | 2/2021 | Bozikis | B26B 21/227 |
| 2021/0213630 | A1 * | 7/2021 | Chatzigrigoriou | B26B 21/227 |
| 2021/0362363 | A1 * | 11/2021 | Wright | B26B 21/4012 |

FOREIGN PATENT DOCUMENTS

| | | | | |
|---|---|---|---|---|
| EP | 3835012 | A1 * | 6/2021 | B26B 21/22 |
| KR | 101876232 | | 7/2018 | |
| KR | 1020190132806 | | 11/2019 | |

OTHER PUBLICATIONS

Korean Intellectual Property Office Application No. 10-2019-0164111, Office Action dated Aug. 6, 2021, 5 pages.

* cited by examiner

RAZOR CARTRIDGE

CROSS-REFERENCE TO RELATED APPLICATION

Pursuant to 35 U.S.C. § 119(a), this application claims the benefit of earlier filing date and right of priority to Korean Patent Application No. 10-2019-0164111, filed on Dec. 10, 2019, the contents of which are incorporated by reference herein in its entirety.

TECHNICAL FIELD

The present disclosure relates to a razor cartridge.

BACKGROUND

The statements in this section merely provide background information related to the present disclosure and do not necessarily constitute prior art.

In recent years, as a solution to reduce the strokes of the razor when shaving, there is an increasing demand for a razor cartridge in which a plurality of shaving blades are disposed at regular intervals (hereinafter, 'multi-blade razor cartridge').

The multi-blade razor cartridge may have a plurality of shaving blades disposed in a blade housing. The shaving blade may be supported by a blade mounting of the blade housing. In particular, the blade mounting may include a mounting base and a mounting protrusion extending from the mounting base, and the plurality of shaving blades may be supported by multiples of the mounting protrusion.

The multi-blade razor cartridge can achieve the effect of cutting body hair by a single stroke with a plurality of shaving blades. This allows the multi-blade razor cartridge to provide the user with a clean shaving by a small number of strokes.

On the other hand, since the multi-blade razor cartridge needs to arrange a plurality of shaving blades within the limited space of the blade housing, a space-efficient shaving blade arrangement is required. To this end, it is necessary to narrow the transverse interval between the mounting protrusions supporting the shaving blades.

However, it is difficult in the manufacturing process to narrow the transverse interval between the mounting protrusions to a certain degree or more on one mounting base. Accordingly, there is a need for a new blade mounting that can be easily manufactured while narrowing the transverse interval between the mounting protrusions.

SUMMARY

According to at least one embodiment, the present disclosure provides a razor cartridge including at least one shaving blade each including a base portion and an edge portion with a cutting edge, and a blade housing including a blade mounting configured to accommodate the at least one shaving blade in a longitudinal direction corresponding to a width direction of the blade housing. The blade mounting includes multiple mounting bases disposed to be spaced apart from each other in the longitudinal direction and at least one mounting protrusion protruding from each of the multiple mounting bases. The base portion of a shaving blade of the at least one shaving blade is supported by mounting protrusions protruding from different mounting bases among the multiple mounting bases.

DETAILED DESCRIPTION

Figure 1:
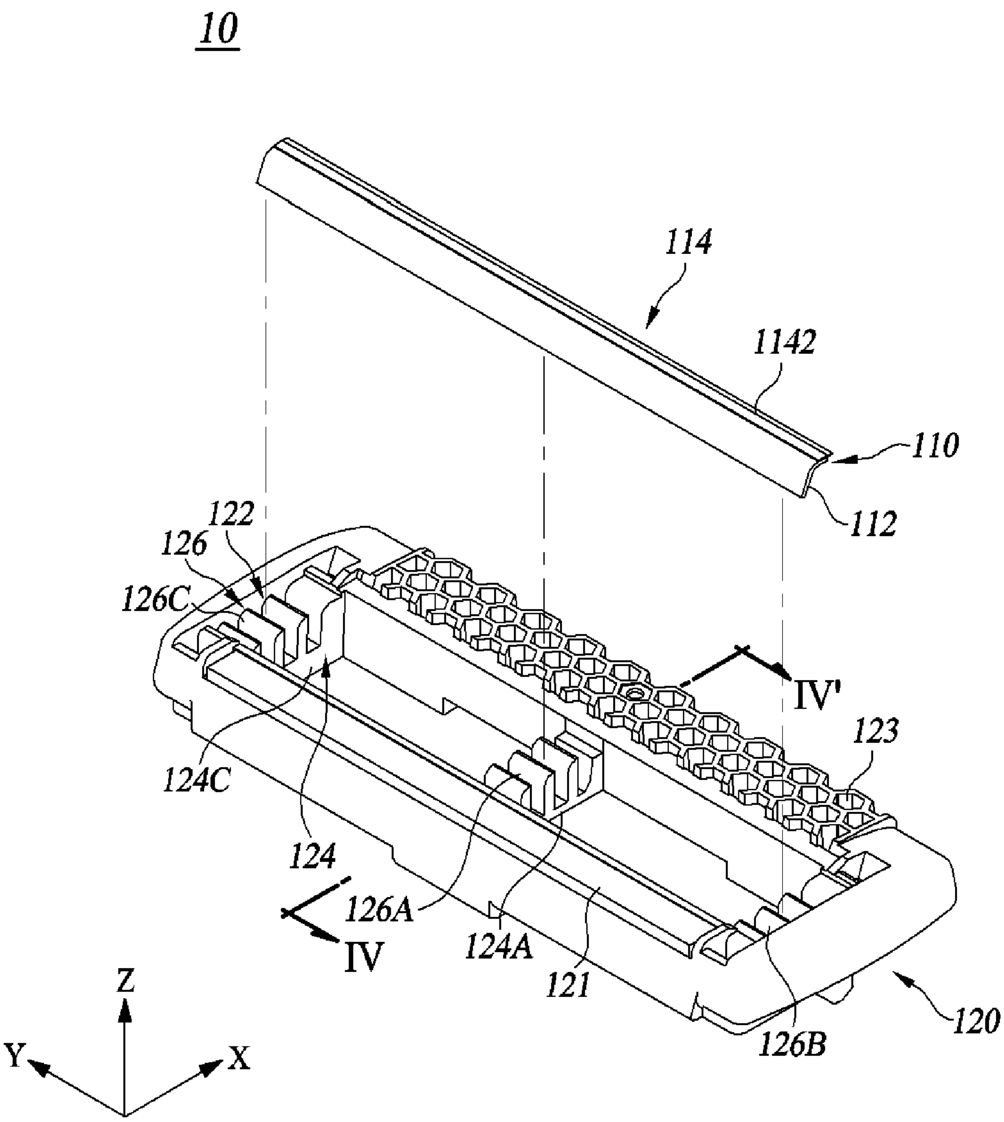
FIG. 1 is a perspective view of a razor cartridge according to at least one embodiment of the present disclosure.

At least one embodiment of the present disclosure seeks to provide a razor cartridge including a blade mounting that is easy to manufacture while reducing the transverse interval between mounting protrusions.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric code such as first, second, i), ii), (a), (b), etc., in numbering components are used solely for the purpose of differentiating one component from the other but not to imply or suggest the substances, the order or sequence of the components. Throughout this specification, when a part "includes" or "comprises" a component, the part is meant to further include other components, not excluding thereof unless there is a particular description contrary thereto.

FIG. 1 is a perspective view of a razor cartridge 10 according to at least one embodiment of the present disclosure.

In FIG. 1, only one shaving blade 110 is shown for the convenience of description.

As shown in FIG. 1, the razor cartridge 10 may include at least one shaving blade 110 and a blade housing 120.

The blade housing 120 may receive at least one shaving blade 110 in the longitudinal direction. Here, the longitudinal direction refers to a direction along which the blade housing 120 is elongated. For example, in FIG. 1, the longitudinal direction is a direction parallel to the Y-axis.

At least one shaving blade 110 received on one side of the blade housing 120 may be maintained by a plurality of clips (not shown).

The blade housing 120 may include a cap 121, a guard 123, and a blade mounting 122.

The cap 121 may be disposed at the rear of the shaving blade 110, specifically, to be disposed on the top side of the blade housing 120 facing the cutting edge 1142 in FIG. 2.

Here, the front and rear of the shaving blade 110 are defined based on the shaving direction of the razor cartridge 10. Accordingly, in FIG. 1, the front and rear of the shaving blade 110 are, respectively, in the positive X-axis direction and the negative X-axis direction with respect to the shaving blade 110.

The guard 123 may be disposed in front of the shaving blade 110 on the upper surface of the blade housing 120.

The guard 123 can stretch the skin in the shaving direction while shaving before the cutting of the body hair by the shaving blade 110.

This can erect the user's body hair in a direction perpendicular to the user's skin surface, whereby the shaving blade 110 can cut the body hair more easily.

The blade mounting 122 may accommodate at least one or more shaving blades 110 in the longitudinal direction. Specifically, the blade mounting 122 may have multiple mounting bases 124A-124C (or collectively 124) from which a plurality of mounting protrusions 126A-126C (or collectively 126) is erected for supporting the at least one shaving blade 110. The blade mounting 122 will be detailed with reference to FIG. 3.

Figure 2A:
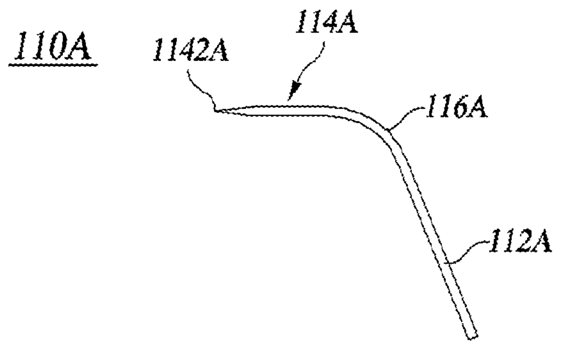
FIGS. 2A to 2C are side views of a shaving blade according to some embodiments of the present disclosure.
Figure 2B:
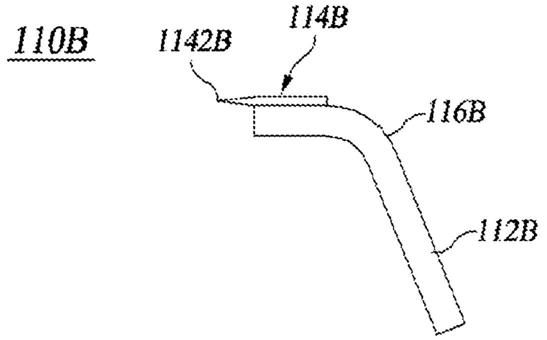
Figure 2C:
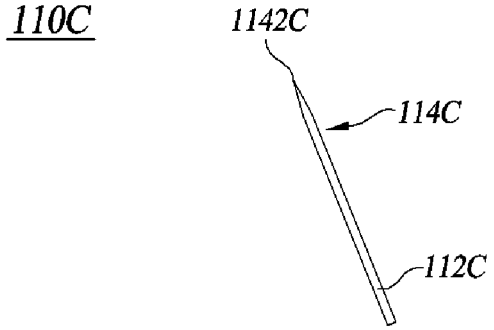

FIGS. 2A to 2C are side views of different types of the shaving blade 110 according to some embodiments of the present disclosure.

As shown in FIG. 1 and FIGS. 2A to 2C, the shaving blade 110 may include a base portion 112 and an edge portion 114.

The base portion 112 may be an area on the shaving blade 110, which is supported by a plurality of mounting protrusions 126.

The edge portion 114 extends from the base portion 112 and may have a cutting edge 1142 at one end thereof.

The shaving blades 110 according to some embodiments of the present disclosure may be classified into various types of blades, depending on the shape and manufacturing method thereof. FIGS. 2A to 2C to be described below illustrate various types of shaving blades 110 according to some embodiment of the present disclosure.

As shown in FIG. 2A, the first shaving blade 110A may be an integral blade in which the base portion 112A and the edge portion 114A are integrally formed, a cutting edge 1142A formed at one end of the edge portion 114A. The base portion 112A of the first shaving blade 110A may include a bent region 116A.

As shown in FIG. 2B, the second shaving blade 110B, unlike the first shaving blade 110A, is a welded blade of which the edge portion 114B is fixed by being welded on one side of the base portion 112B. A cutting edge 1142B is formed at one end of the edge portion 114B. The base portion 112B of the second shaving blade 110B may include a bent region 116B, similar to the first shaving blade 110A.

A shown in FIG. 2C, for the third shaving blade 110C, like the first shaving blade 110A, the base portion 112C and the edge portion 114C may be formed into an integral blade. A cutting edge 1142C is formed at one end of the edge portion 114C.

However, the base portion 112C of the third shaving blade 110C may not include a bent region, unlike the first shaving blade 110C and the second shaving blade 110B. Accordingly, the third shaving blade 110C may have a substantially straight shape.

The shaving blades shown in FIGS. 2A to 2C are merely some of the various shaving blades according to the present disclosure. The shaving blade according to the present disclosure may have a configuration other than the shaving blades illustrated in FIGS. 2A to 2C.

Figure 3:
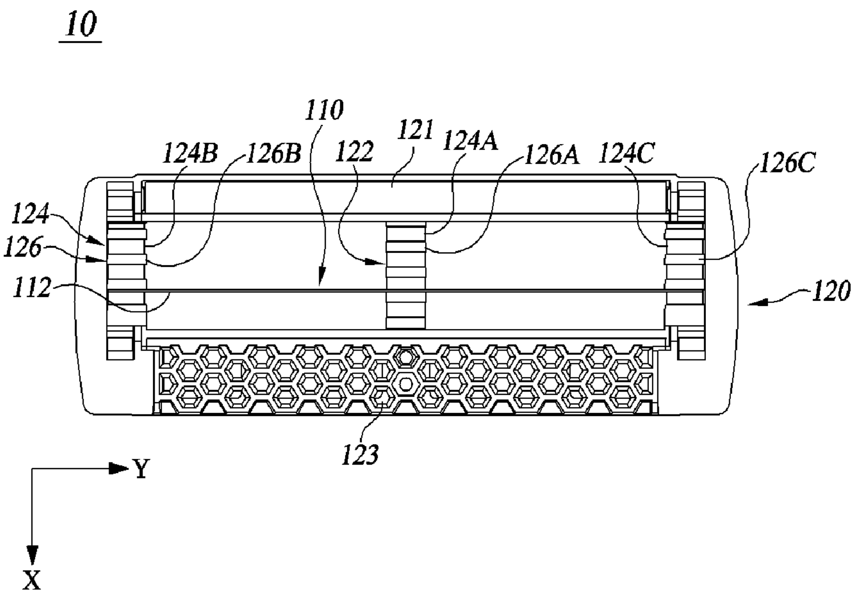
FIG. 3 is a front view of the razor cartridge according to at least one embodiment of the present disclosure.

FIG. 3 is a front view of the razor cartridge 10 according to at least one embodiment of the present disclosure.

FIG. 3 illustrates only one shaving blade 110 for convenience of explanation, omitting the edge portion 114 thereof.

As shown in FIG. 3, the blade mounting 122 may include the multiple mounting bases 124 and mounting protrusions 126.

The multiple mounting bases 124 may be disposed to be spaced apart from each other along the longitudinal direction, and the mounting protrusions 126 may be formed to protrude from the multiple mounting bases 124.

In FIG. 3, the blade mounting 122 is shown to include three mounting bases 124, but the present disclosure is not limited thereto.

For example, the blade mounting 122 may include two or four or more mounting bases 124.

The mounting protrusions 126 protruding from each of the multiple mounting bases 124 may be disposed in a transverse direction perpendicular to the longitudinal direction. Here, the transverse direction refers to a direction in which the blade housing 120 extends over a shorter span. For example, in FIG. 3, the transverse direction is a direction parallel to the X-axis.

Specifically, the mounting protrusions 126 disposed on each mounting base 124 may be aligned along the transverse direction.

In FIG. 3, the mounting protrusions 126 disposed on each mounting base 124 are shown to be disposed collinearly along the transverse direction, but the present disclosure is not so limited.

For example, the multiple mounting protrusions 126 disposed on each mounting base 124 may be arranged in zigzags along the transverse direction, or they may be arranged out of alignment with each other.

Additionally, in FIG. 3, the transverse interval between the multiple mounting protrusions 126 is shown to be the same in all mounting bases 124, but the present disclosure is not limited thereto.

For example, the transverse interval between the multiple mounting protrusions 126 may be configured to be different for each mounting base 124 and/or for each mounting protrusion 126.

Figure 4:
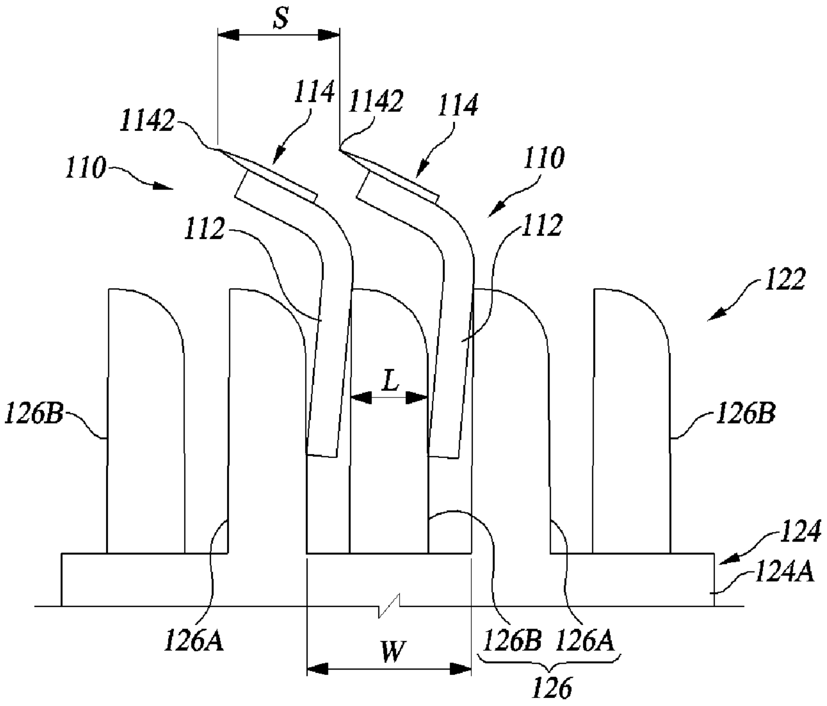
FIG. 4 is a cross-sectional view of the razor cartridge according to at least one embodiment of the present disclosure, taken in the direction IV-IV' of FIG. 1.

FIG. 4 is a cross-sectional view of the razor cartridge 10 according to at least one embodiment of the present disclosure, taken in the direction IV-IV' of FIG. 1.

As shown in FIGS. 3 and 4, the base portion 112 of the shaving blade 110 may be supported by the mounting protrusions 126 protruding from different mounting bases 124.

Each shaving blade 110 according to at least one embodiment is supported by each mounting protrusion 126 protruding from each mounting base 124.

In other words, the shaving blade 110 according to at least one embodiment is not supported by two or more mounting protrusions 126 from one mounting base 124, but it is supported by only one mounting protrusion 126 per mounting base 124.

Accordingly, a transverse interval W of the multiple mounting protrusions 126 disposed on each mounting base 124 can be substantially wider than those between the conventional mounting protrusions. Specifically, transverse interval W between the multiple mounting protrusions 126 disposed on each mounting base 124 may be equal to or greater than transverse spacing S of the cutting edges 1142 of the plurality of shaving blades 110.

Additionally, transverse interval W between the multiple mounting protrusions 126 disposed on each mounting base 124 may be equal to or greater than transverse width 'L' of the mounting protrusion 126.

Here, transverse interval W between the multiple mounting protrusions 126 refers to the shortest linear distance between one mounting protrusion 126 protruding from one mounting base 124 and the neighboring mounting protrusion 126 next to the one mounting protrusion 126.

The blade mounting 122 according to at least one embodiment of the present disclosure allows transverse interval W to be increased between the adjacent mounting protrusions 126 on one mounting base 124 by configuring the blade housing 120 to support a single shaving blade 110 with each mounting protrusion 126 protruding from each mounting base 124.

It is generally impractical for one mounting base 124 to have the transverse interval between the mounting protrusions 126 reduced to a certain interval or shorter as dictated by the manufacturing process, and accordingly, the blade mounting 122 according to at least one embodiment of the present disclosure is advantageously easy to manufacture.

Meanwhile, transverse width 'L' of the mounting protrusion 126 may be 0.2 mm to 4.0 mm, preferably 0.38 mm to 1.28 mm. Additionally, transverse interval W between the multiple mounting protrusions 126 may be 0.3 mm to 5.0 mm, preferably 0.62 mm to 1.52 mm. Further, transverse interval S between the cutting edges 1142 may be 0.3 mm to 5.0 mm, preferably 0.5 mm to 1.4 mm. However, the present disclosure is not limited to these particular values or ranges.

The base portion 112 of the shaving blade 110 may be supported by the mounting protrusions 126 by making point contact, linear contact, or surface contact therewith.

The blade mounting 122 according to at least one embodiment can somewhat widen the transverse interval between the mounting protrusions 126 such that the mounting protrusion 126 can be configured in various ways.

Therefore, the mounting protrusion 126 according to at least one embodiment may have an advantageous shape for surface contact with the base portion 112 of the shaving blade 110. The base portion 112 may be supported more firmly by the mounting protrusions 126 by making surface contact with the mounting protrusions 126.

As shown in FIGS. 1 and 3, the base portion 112 of the shaving blade 110 may be supported by at least three mounting protrusions 126 along the longitudinal direction.

Specifically, the base portion 112 may be supported by at least three mounting protrusions 126 each protruding from at least three mounting bases 124 spaced apart from each other along the longitudinal direction.

More specifically, any one of one surface and the other surface of the base portion 112 may be supported by at least one mounting protrusion 126, the other one of the one surface and the other surface of the base portion 112 may be supported by at least two mounting protrusions 126.

In order for one shaving blade 110 to be supported in a fixed position on the blade housing 120, a resultant force and a resultant moment acting on one shaving blade 110 need to be 0.

Accordingly, one shaving blade 110 according to at least one embodiment of the present disclosure may be securely seated on the blade housing 120 by being supported by at least three mounting protrusions 126.

The mounting protrusions 126 may be formed by injection molding on the mounting base 124, but the present disclosure is not limited thereto.

As shown in FIG. 3, the multiple mounting bases 124 may include a first mounting base 124A, a second mounting base 124B, and a third mounting base 124C.

The blade mounting 122 may have multiple first mounting protrusions 126A arranged on the first mounting base 124A along the transverse direction.

The second mounting base 124B may be spaced apart from the first mounting base 124A along the longitudinal direction in one direction. The blade mounting 122 may have multiple second mounting protrusions 126B arranged on the second mounting base 124B along the transverse direction.

The third mounting base 124C may be spaced apart from the first mounting base 124A along the longitudinal direction in another direction. The blade mounting 122 may have multiple third mounting protrusions 126C arranged on the third mounting base 124C along the transverse direction.

The multiple first mounting protrusions 126A may not be aligned with the multiple second mounting protrusions 1268 and with the multiple third mounting protrusions 126C along the longitudinal direction. The multiple second mounting protrusions 1268 may be aligned with the multiple third mounting protrusions 126C along the longitudinal direction.

In this case, any one of the one surface and the other surface of the base portion 112 of the shaving blade 110 may be supported by the first mounting protrusion 126A, and the other one of the one surface and the other surface of the base portion 112 may be supported by the second mounting protrusion 1268 and the third mounting protrusion 126C.

This allows the base portion 112 to be supported by at least three mounting protrusions 126, and thereby the shaving blade 110 may be firmly seated on the blade housing 120.

Figure 5:
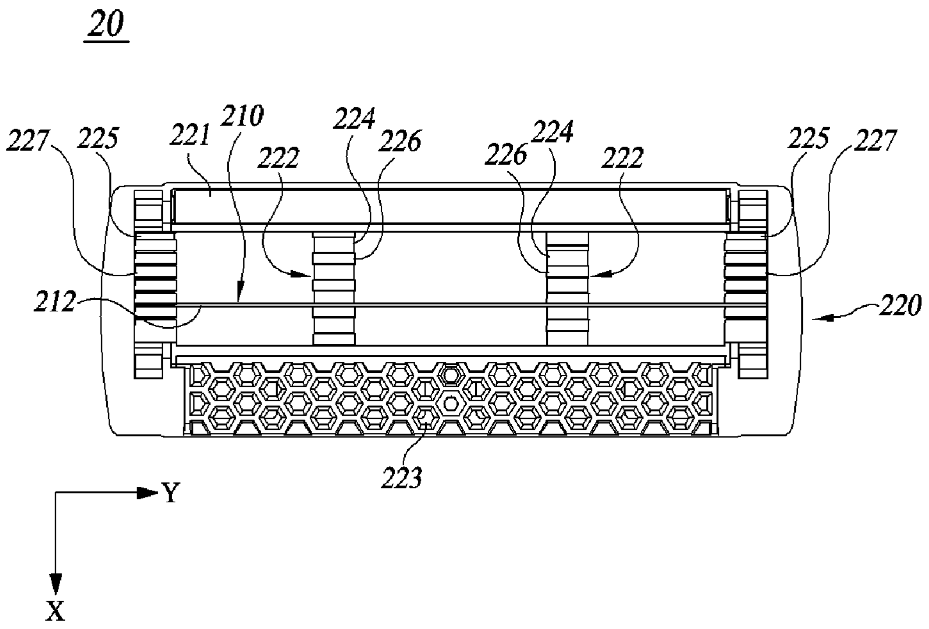
FIG. 5 is a front view of a razor cartridge according to another embodiment of the present disclosure.

Different from the above embodiments as illustrated in FIGS. 1 to 4, the following second embodiment of the present disclosure illustrated in FIG. 5 provides a blade housing that includes outer bases and outer protrusions. The following focuses on the distinctive features according to the second embodiment of the present disclosure, omitting a repetitive description of a configuration substantially the same as that of the aforementioned embodiments.

FIG. 5 is a front view of a razor cartridge 20 according to the second embodiment of the present disclosure.

FIG. 5 illustrates just one shaving blade 210, omitting an edge portion thereof for convenience of explanation.

As shown in FIG. 5, the blade housing 220 may include a cap 221, a guard 223, blade mountings 222, a plurality of outer bases 225, and a plurality of outer protrusions 227.

The cap 221 may be disposed rearwardly of the shaving blade 210, and the guard 223 may be disposed in front of the shaving blade 210.

The blade mountings 222 may receive at least one or more shaving blades 210 in the longitudinal direction.

The blade mountings 222 may include multiple mounting bases 224 and multiple mounting protrusions 226. The multiple mounting bases 224 may be disposed to be spaced apart from each other in the longitudinal direction, and the multiple mounting protrusions 226 may protrude from each of the multiple mounting bases 224.

The plurality of outer bases 225 may be disposed on both sides of the blade housing 220 along the longitudinal direction. Accordingly, the multiple blade mountings 222 may be disposed between the plurality of outer bases 225.

The plurality of outer protrusions 227 may protrude from each outer base 225.

The base portion 212 of the shaving blade 210 may be supported by the mounting protrusions 226 protruding from different mounting bases 224 and by at least two outer protrusions 227 protruding from one outer base 225.

Specifically, one of one surface and the other surface of the base portion 212 of the shaving blade 210 may be supported by one mounting protrusion 226 protruding from any one of the mounting bases 224, and the other one of the one surface and the other surface of the base portion 212 may be supported by one mounting protrusion 226 protruding from another mounting base 224.

Further, both surfaces of the base portion 212 of the shaving blade 210 may be supported by at least two outer protrusions 227 protruding from one outer base 225.

Therefore, the razor cartridge according to the second embodiment has the outer protrusions 227 disposed on both sides of the multiple mounting bases 224 and configured to support both surfaces of the base portion 212 of the shaving blade 210, and thereby keeps the shaving blade to be more firmly seated in the blade housing 220.

Figure 6:
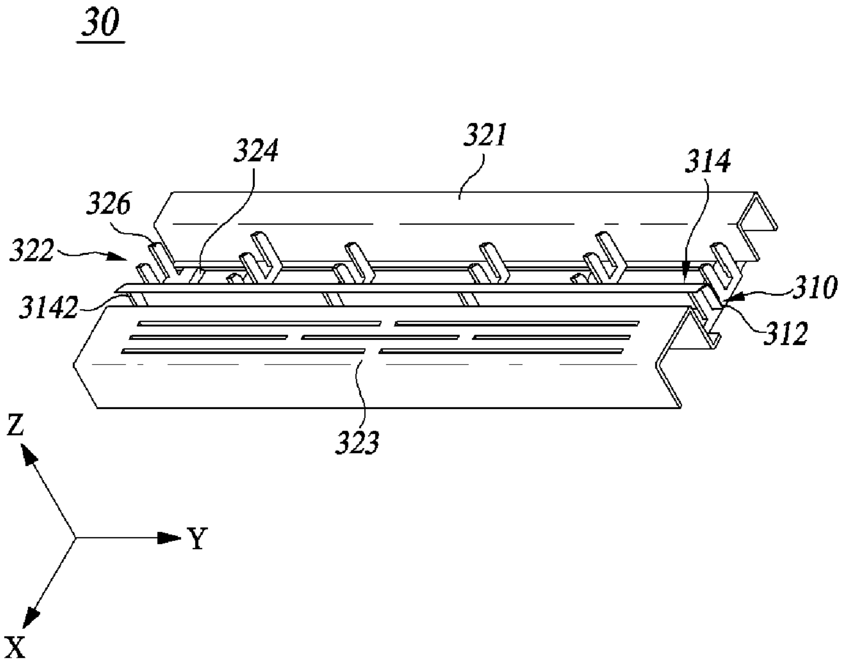
FIG. 6 is a perspective view of a razor cartridge according to yet another embodiment of the present disclosure.
Figure 7:
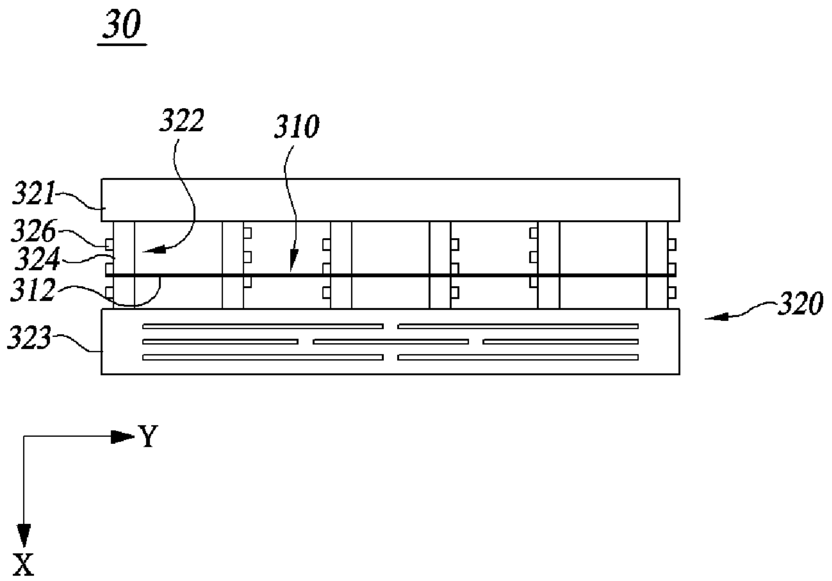
FIG. 7 is a front view of the razor cartridge according to the yet another embodiment of the present disclosure.

Different from the above embodiments as illustrated in FIGS. 1 to 4, the following third embodiment of the present disclosure illustrated in FIGS. 6 and 7 provides outer bases and outer protrusions that are made of a plate. The following focuses on the distinctive features according to the third embodiment of the present disclosure, omitting a repetitive description of a configuration substantially the same as that of the aforementioned embodiments.

FIG. 6 is a perspective view of a razor cartridge 30 according to the third embodiment of the present disclosure.

FIG. 7 is a front view of a razor cartridge 30 according to the third embodiment of the present disclosure.

FIGS. 6 and 7 illustrate just one shaving blade 310 with an edge portion 314 for convenience of description.

Further, FIG. 7 illustrates the shaving blade 310, omitting the edge portion 314 for convenience of explanation.

As shown in FIGS. 6 and 7, the razor cartridge 30 may have a blade housing 320 that includes a cap 321, a guard 323, and a blade mounting 322.

The cap 321 may be disposed rearwardly of the shaving blade 310, and the guard 323 may be disposed in front of the shaving blade 310.

The blade mounting 322 may receive at least one shaving blade 310 in the longitudinal direction.

The blade mounting 322 may include multiple mounting bases 324 and multiple mounting protrusions 326. The multiple mounting bases 324 may be disposed to be spaced apart from each other along the longitudinal direction, and the multiple mounting protrusions 326 may protrude from each of the multiple mounting bases 324.

The base portion 312 may be supported by mounting protrusions 326 protruding from different mounting bases 324.

Specifically, a single shaving blade 310 may be supported by each mounting protrusion 326 protruding from each of the mounting bases 324. For example, the base portion 312 of the single shaving blade 310 may be supported by a single mounting protrusion 326 protruding from a corresponding mounting base 324.

The base portion 312 of the shaving blade 310 may be supported by at least three mounting protrusions 326 along the longitudinal direction. Specifically, the base portion 312 may be supported by at least three mounting protrusions 326 each protruding from at least three mounting bases 324 spaced apart from each other along the longitudinal direction.

More specifically, any one of one surface and the other surface of the base portion 312 may be supported by at least one mounting protrusion 326, the other one of the one surface and the other surface of the base portion 312 may be supported by at least two mounting protrusions 326.

The mounting base 324 and the mounting protrusions 326 may be made of a single plate. The mounting protrusions 326 may be formed by being bent from the mounting base 324.

The thickness of the plate may be 0.20 mm to 0.50 mm, and the mounting protrusions 326 may have the same thickness as the plate. The thickness of the mounting protrusions 326 is approximately eight times the thickness of the injection-molded mounting protrusion.

Accordingly, the mounting protrusion 326 according to the third embodiment of the present disclosure may have a thickness suitable for making surface contact with the base portion 312 of the shaving blade 310. The base portion 312 may be more firmly supported by the mounting protrusions 326 by making surface contact with the mounting protrusions 326.

Figure 8:
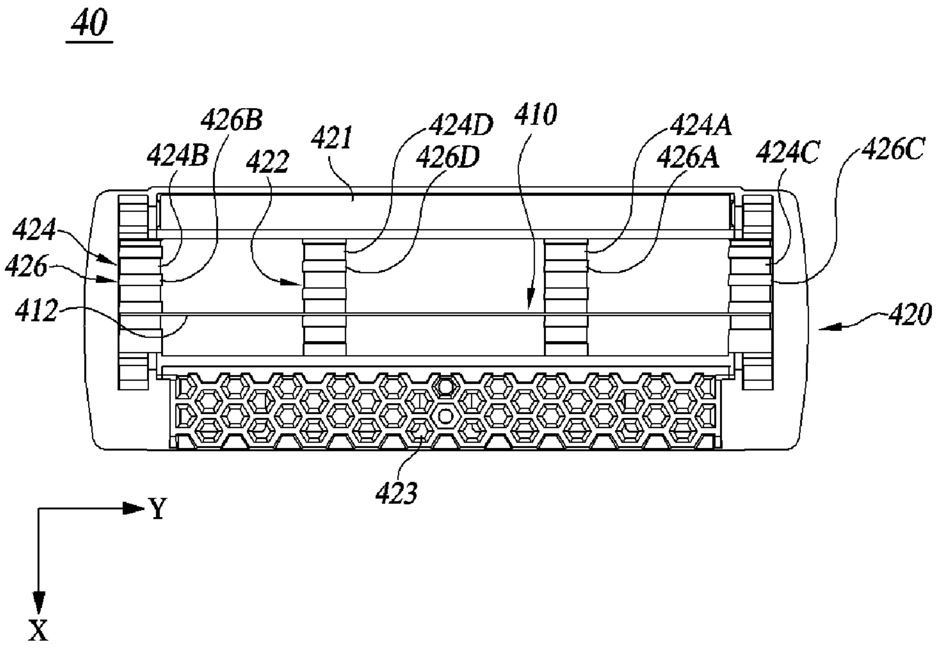
FIG. 8 is a front view of a razor cartridge according to yet another embodiment of the present disclosure.
Figure 9:
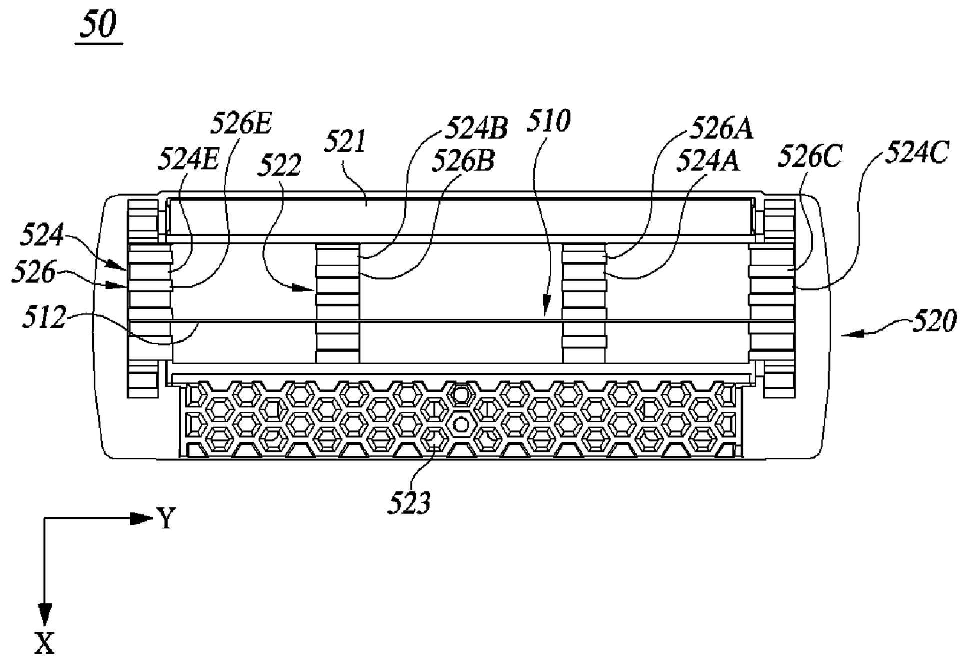
FIG. 9 is a front view of a razor cartridge according to yet another embodiment of the present disclosure.

Different from the above embodiments as illustrated in FIGS. 1 to 4, the following fourth and fifth embodiments of the present disclosure illustrated in FIGS. 8 and 9 provide a blade mounting including four mounting bases. The following focuses on the distinctive features according to the fourth and fifth embodiments of the present disclosure, omitting a repetitive description of a configuration substantially the same as that of the aforementioned embodiments.

FIG. 8 is a front view of a razor cartridge 40 according to the fourth embodiment of the present disclosure.

FIG. 8 illustrates just one of a plurality of shaving blades 410, omitting an edge portion thereof for convenience of explanation.

As shown in FIG. 8, multiple mounting bases 424 may include a first mounting base 424A, a second mounting base 424B, a third mounting base 424C, and a fourth mounting base 424D.

In the first mounting base 424A, multiple first mounting protrusions 426A may be disposed along the transverse direction.

The second mounting base 424B may be spaced apart from the first mounting base 424A along the longitudinal direction in one direction. In the second mounting base 424B, multiple second mounting protrusions 426B may be disposed along the transverse direction.

The third mounting base 424C may be spaced apart from the first mounting base 424A along the longitudinal direction in another direction opposite the one direction. In the third mounting base 424C, multiple third mounting protrusions 426C may be disposed along the transverse direction.

The fourth mounting base 424D may be disposed between the first mounting base 424A and the second mounting base 424B. Multiple fourth mounting protrusions 426D protruding from the fourth mounting base 424D may be disposed along the transverse direction.

The multiple first mounting protrusions 426A may not be aligned with the multiple second mounting protrusions 426B and with the multiple third mounting protrusions 426C along the longitudinal direction.

The multiple second mounting protrusions 426B may be aligned with the multiple third mounting protrusions 426C along the longitudinal direction, and the fourth mounting protrusion 426D may be arranged in parallel to the multiple first mounting protrusions 426A along the longitudinal direction.

In this case, any one of one surface and the other surface of the base portion 412 of the shaving blade 410 may be supported by a first mounting protrusion 426A and a fourth mounting protrusion 426D, and the other of the one surface and the other surface of the base portion 412 may be supported by a second mounting protrusion 426B and a third mounting protrusion 426C.

This allows the base portion 412 to be supported by at least four mounting protrusions 426A-426D (or collectively 426), and the shaving blade 410 may be firmly seated on the blade housing 420.

FIG. 9 is a front view of a razor cartridge 50 according to the fifth embodiment of the present disclosure.

FIG. 9 illustrates just one of a plurality of shaving blades 510, omitting an edge portion thereof for convenience of explanation.

As shown in FIG. 9, multiple mounting bases 524 may include a first mounting base 524A, a second mounting base 524B, a third mounting base 524C, and a fifth mounting base 524E.

In the first mounting base 524A, multiple first mounting protrusions 526A may be disposed along the transverse direction.

The second mounting base 524B may be spaced apart from the first mounting base 524A along the longitudinal direction in one direction. In the second mounting base 524B, multiple second mounting protrusions 526B may be disposed along the transverse direction.

The third mounting base 524C may be spaced apart from the first mounting base 524A along the longitudinal direction in another direction opposite the one direction. In the third mounting base 524C, multiple third mounting protrusions 526C may be disposed along the transverse direction.

In the fifth mounting base 524E, multiple fifth mounting protrusions 526E may be disposed along the transverse direction, and the fifth mounting base 524E may be spaced apart from the second mounting base 524B along the longitudinal direction such that the second mounting base 524B is disposed between the first mounting base 524A and the fifth mounting base 524E.

The multiple first mounting protrusions 526A and the multiple fifth mounting protrusions 526E may be arranged out of alignment with the multiple second mounting protrusions 526B and the multiple third mounting protrusions 526C along the longitudinal direction.

The multiple second mounting protrusions 526B may be arranged in alignment with the multiple third mounting protrusions 526C along the longitudinal direction, and the multiple fifth mounting protrusions 526E may be arranged in alignment with the multiple first mounting protrusions 526A along the longitudinal direction.

In this case, any one of one surface and the other surface of the base portion 512 of the shaving blade 510 may be supported by a first mounting protrusion 526A and a fifth mounting protrusion 526E, and the other of the one surface and the other surface of the base portion 512 may be supported by a second mounting protrusion 526B and a third mounting protrusion 526C.

This allows the base portion 512 to be supported by at least four mounting protrusions 526A, 526B, 526C, and 526E (or collectively 526), and the shaving blade 510 may be firmly seated on the blade housing 520.

Figure 10:
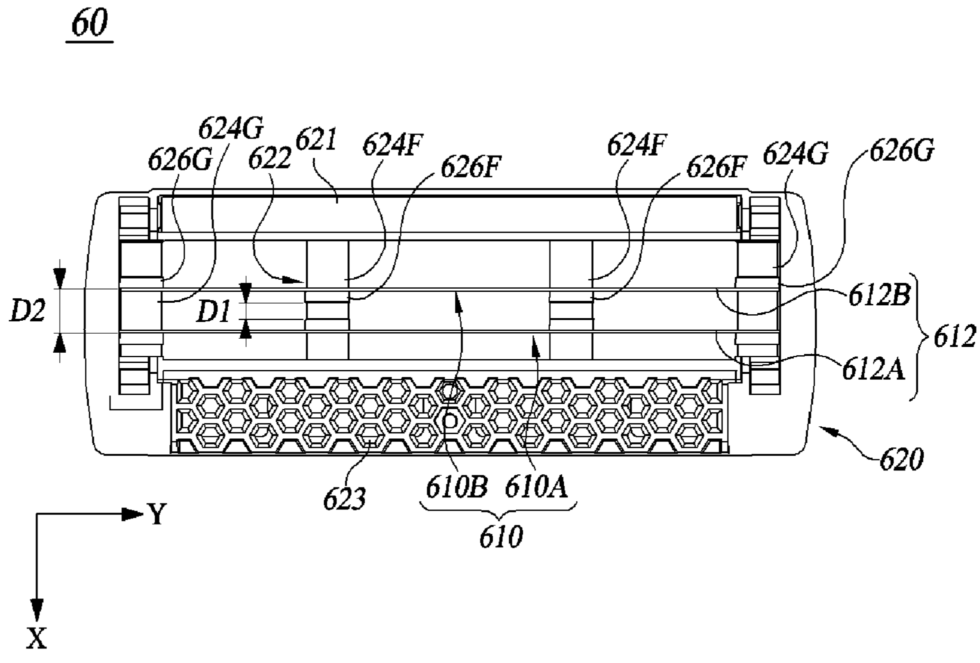
FIG. 10 is a front view of a razor cartridge according to yet another embodiment of the present disclosure.

Different from the above embodiments as illustrated in FIGS. 1 to 4, the following sixth embodiment of the present disclosure illustrated in FIG. 10 provides mounting bases each having multiple mounting protrusions with different transverse intervals for each of the mounting bases. The following focuses on the distinctive features according to the sixth embodiment, omitting a repetitive description of a configuration substantially the same as that of the aforementioned embodiments.

FIG. 10 is a front view of a razor cartridge 60 according to the sixth embodiment of the present disclosure.

FIG. 10 illustrates just two shaving blades 610A and 6108 (or collectively 610) of a plurality of shaving blades for convenience of explanation. Therefore, the number of shaving blades 610 of the present disclosure is not limited to two, and an additional shaving blade may be further provided.

Additionally, FIG. 10 shows each shaving blade 610 having an edge portion for convenience of description.

As shown in FIG. 10, a blade housing 620 may be provided with a blade mounting 622 including multiple mounting bases 624 made of multiple sixth mounting bases 624F and multiple seventh mounting bases 624G.

In each of the sixth mounting bases 624F, multiple sixth mounting protrusions 626F may be disposed along the transverse direction.

The multiple seventh mounting bases 624G may be disposed to be spaced apart on both sides of the multiple sixth mounting bases 624F along the longitudinal direction.

In each of the seventh mounting bases 624G, multiple seventh mounting protrusions 626G may be disposed along the transverse direction.

The transverse interval between the multiple sixth mounting protrusions 626F may be a first distance D1, and the transverse interval between the multiple seventh mounting protrusions 626G may be a second distance D2 greater than first distance D1.

The shaving blades 610 may have base portions 612A and 612B (or collectively 612) each having one surface facing the guard 623 and the other surface facing the cap 621.

The base portion 612A of the front shaving blade 610A has one surface that is adjacent to the guard 623 and may be supported by two seventh mounting protrusions 626G protruding from different seventh mounting bases 624G, and the base portion 612A has the other surface supported by two sixth mounting protrusions 626F protruding from different sixth mounting bases 624F.

The base portion 612B of the rear shaving blade 610B has one surface that is adjacent to the cap 621 and may be supported by two sixth mounting protrusions 626F protruding from the different sixth mounting bases 624F, and the base portion 612B has the other surface supported by two seventh mounting protrusions 626G protruding from the different seventh mounting bases 624G.

This allows the base portion 612A of the front shaving blade 610A and the base portion 612B of the rear shaving blade 6108 to be supported by at least four mounting protrusions 626, respectively, and the front shaving blade 610A and the rear shaving blade 610B may be firmly seated on the blade housing 620.

Although FIG. 10 illustrates that the blade mounting 622 is configured to have the multiple sixth mounting protrusions 626F with smaller transverse interval D1 therebetween and the multiple seventh mounting protrusions 626G with larger transverse interval D1 therebetween, the present disclosure is not limited thereto.

For example, in the blade mounting 626, the transverse interval between the multiple sixth mounting protrusions 626F may be larger than the transverse interval between the multiple seventh mounting protrusions 626G.

In this case, one surface of the base portion 612A of the front shaving blade 610A may be supported by two sixth mounting protrusions 626F, and the other surface of the base portion 612A of the front shaving blade 610A may be supported by two protruding seventh mounting protrusions 626G.

Further, one surface of the base portion 612B of the rear shaving blade 610B may be supported by two seventh mounting protrusions 626G, and the other surface of the base portion 6128 of the rear shaving blade 6108 may be supported by two sixth mounting protrusions 626F.

As described above, according to some embodiments of the present disclosure, with the mounting protrusions disposed in a space-efficient manner, multiple shaving blades can be advantageously positioned in the blade housing, even without increasing the size of the blade housing.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A razor cartridge, comprising:

a first shaving blade and a second shaving blade each including a base portion and an edge portion with a cutting edge, the base portion comprising a first surface extending along a longitudinal axis and a second surface opposite to the first surface; and a blade housing including a blade mounting configured to accommodate the first shaving blade and the second shaving blade along the longitudinal axis corresponding to a width direction of the blade housing, wherein the blade mounting includes:

a first mounting base and a second mounting base spaced apart from each other along the longitudinal axis, the first mounting base positioned on a first inner wall of the blade housing and the second mounting base positioned on a second opposite inner wall of the blade housing;

first set of mounting protrusions protruding from the first mounting base and extending from a first side of the first mounting base to a second side of the first mounting base; and, a second set of mounting protrusions protruding from the second mounting base and extending from a first side of the second mounting base to a second side of the second mounting base, wherein the first surface of the base portion of the first shaving blade is supported by at least one of the first set of mounting protrusions and at least one of the second set of mounting protrusions, and wherein the cutting edge of the first shaving blade and the cutting edge of the second shaving blade are immediately neighboring each other in a transverse direction perpendicular to the longitudinal axis, and wherein a first transverse interval between two consecutive mounting protrusions in each of the first set of mounting protrusions and the second set of mounting protrusions is equal to or greater than a second transverse interval between the cutting edge of each of the first shaving blade and the second shaving blade.

2. The razor cartridge of claim 1, wherein the second surface is supported by one or more of the first and second sets of mounting protrusions.

3. The razor cartridge of claim 1, wherein each of the first and second sets of mounting protrusions are disposed in the transverse direction.

4. The razor cartridge of claim 3, wherein each of the first and second sets of mounting protrusions are aligned along the transverse direction.

5. The razor cartridge of claim 1, wherein the blade mounting further includes:

a third mounting base disposed between the first mounting base and the second mounting base along the longitudinal axis;

a third set of mounting protrusions protruding from the third mounting base;

first set of mounting protrusions-spaced apart from the third mounting base along the longitudinal axis in a first direction; and second set of mounting protrusions spaced apart from the third mounting base along the longitudinal axis in a second direction opposite to the first direction, wherein the third set of mounting protrusions are not aligned with the first set of mounting protrusions and the second set of mounting protrusions along the longitudinal axis, and wherein the first set of mounting protrusions and the second set of mounting protrusions are respectively aligned with each other along the longitudinal axis.

6. The razor cartridge of claim 5, wherein the blade mounting further includes:

a fourth mounting base disposed between the first mounting base and the second mounting base; and a fourth set of mounting protrusions protruding from the fourth mounting base and disposed along the transverse direction, and wherein the fourth set of mounting protrusions are arranged in parallel with the first set of mounting protrusions along the longitudinal axis.

7. The razor cartridge of claim 1, wherein the first and second sets of mounting protrusions are formed respectively by bending the first and second mounting bases.

8. The razor cartridge of claim 7, wherein the first and second mounting bases and the first and second sets of mounting protrusions have a same thickness and are made of one plate.

9. The razor cartridge of claim 1, wherein the first and second sets of mounting protrusions are formed together with the first and second mounting bases by injection molding.

10. The razor cartridge of claim 1, wherein the blade housing includes a guard extending along the longitudinal axis, and wherein the guard is not aligned with either of the first and second mounting bases in the transverse direction.

11. The razor cartridge of claim 1, wherein a transverse width of each of the first and second sets of mounting protrusions is between 0.2 mm to 0.4 mm.

* * * * *